Patented Oct. 13, 1931

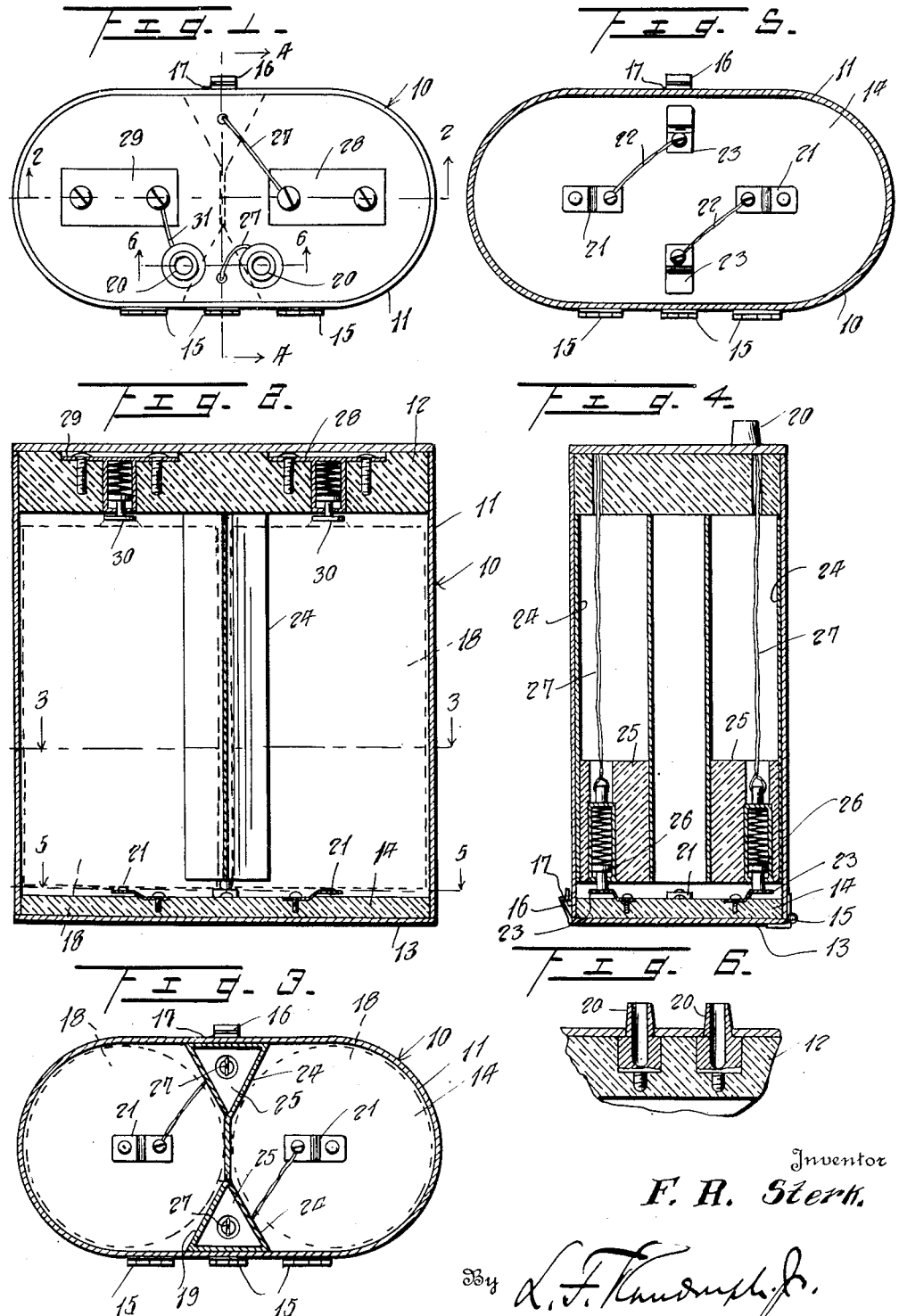

1,827,625

UNITED STATES PATENT OFFICE

FRANK R. STERK, OF KANSAS CITY, MISSOURI

BATTERY CASE

Application filed July 19, 1928. Serial No. 293,960.

My invention relates to a battery case or unit whereby dry cell batteries, such as are used in flashlights of round type, may be used and arranged for ready electrical attachment to ear phones, especially such as are used by the deaf.

An important object is to provide a novel construction of case wherein the dry cells may be removably carried in connection with electrical parts embodying terminals for connection of phone plugs of various types of ear phones, or the like thereto.

An important advantage of the case of the present invention is the convenience provided for replacement of the cells. Heretofore it has been necessary to make replacements of batteries of special type through the respective ear phone manufacturers, or their agents, sometimes causing great inconvenience to users of ear phone devices because of delay in shipments of batteries or of unexpected extended use of their devices causing the batteries to become weak or discharged before the calculated time of regular shipments.

My invention is intended to make replenishment of electrical energy a relatively simple matter, namely, by securing the universally sold flashlight cells and placing these cells in the battery case.

A further advantage resides in a much more economical operation of hearing devices due to lower cost of ordinary cells as compared to cost of special batteries as sold by the ear phone manufacturers.

Additional objects and advantages will become apparent from a consideration of the description following taken in connection with accompanying drawings illustrating an operative embodiment.

In said drawings:—

Figure 1 is plan view of the device,

Figure 2 is a vertical sectional view taken on the line 2—2 of Figure 1.

Figure 3 is a sectional view taken on the line 3—3 of Figure 2,

Figure 4 is a sectional view taken on the line 4—4 of Figure 1,

Figure 5 is a sectional view taken on the line 5—5 of Figure 2, and

Figure 6 is a detail sectional view taken on the line 6—6 of Figure 1.

Referring specifically to the drawings, the device is provided with a suitable casing as at 10 made up of a one-piece vertical wall 11, preferably of metal which is closed at its top by means of a block of any suitable insulation as at 12. At the bottom, said wall 11 has a hinge closure 13, carrying a plate or block of insulation of any preferred kind as at 14. Such closure 13 by means of hinges 15 is fastened to the casing wall 11. A spring latch 16 is carried by the closure 13 to engage a lug 17 carried by the wall 11.

The case is of a size adapted to removably contain two or more dry cell batteries 18. Within the case, dividing the spaces for said batteries 18, is a partition and brace 19. Such element 19 is widened at the outer ends thereof and is fastened to the wall 11, preferably being metallic like said wall. The particular construction of said element 19 serves to brace the sides of the wall 11 against inward collapse. It will be realized that when the batteries 18 need replenishing they may be removed upon opening the closure 13.

The electric energy is obtained by the phones by connecting plugs of opposite polarity thereof to conventional terminals 20 carried by the block of insulation 12 and located according to the special type of ear phone used and at the top of such block as shown particularly in Figures 1 and 6, it being understood that cases are to be made for attachment to all of the different types of marketed ear phones.

In order to make the proper electrical connections with the terminals of the batteries, the block 14 has contacts 21 engageable by two of the terminals of the batteries. Conductors 22 lead from the contacts 21 to contacts 23 which are located below the enlarged portions 24 of the partition and brace 19. Such enlarged portions 24 carry blocks of any suitable insulation as at 25, each of which is equipped with a spring contact 26 of conventional design. Said contacts 26 are adapted to engage the contacts 23. Conductors 27 extend from the contacts 26, one to a contact plate 28 and the other to one of the binding elements 20.

Plates 28 and a companion conductor plate 29 are fastened to the block 12 and have spring pressed contacts 30, of conventional design, adapted to engage the remaining contacts of the batteries 18. A conductor 31 extends from the plate 29 to the other terminal 20.

Various changes may be resorted to provided they fall within the spirit and scope of the invention.

I claim as my invention:

1. A device of the character described, comprising a case, first and second contacts carried by the case, a closure for said case, first and second contacts carried by the closure, said first contacts being adapted to engage opposite poles of a dry cell, said second contacts being adapted to engage opposite poles of another dry cell, a partition in the case, insulation carried by the partition, first and second contacts mounted on the insulation and adapted for electrical connection with the first and second contacts on the closure, respectively, first and second binding posts on the case, the first binding post being electrically connected with the first contact on the case, the second binding post being electrically connected with the second contact on the partition insulation, and the second contact on the case being electrically connected with the first contact on the partition insulation.

2. A device of the character described, comprising a case, first and second contacts carried by the case, a closure for said case, first and second contacts carried by the closure, said first contacts being adapted to engage opposite poles of a dry cell, said second contacts being adapted to engage opposite poles of another dry cell, a partition in the case, insulation carried by the partition, first and second contacts mounted on the insulation, other first and second contacts on the closure adapted to engage said first and second partition contacts, respectively, each of said other first and second contacts being electrically connected with the first-mentioned first and second contacts on the closure, respectively, the first partition contact being electrically connected with the second contact on the case, first and second binding posts on the case, the first binding post being electrically connected with the first contact on the case, and the second binding post being electrically connected with the second partition contact.

3. A device of the character described, comprising a case, a block of insulation carried by the case, first and second contacts carried by said block of insulation, a closure for the case, a block of insulation carried by the closure, first and second contacts carried by the last mentioned block of insulation, said first contacts being adapted to engage opposite poles of a dry cell, said second contacts being adapted to engage opposite poles of another dry cell, a partition in the case providing receptacles for said dry cells, insulation carried by the partition, first and second contacts mounted on the partition insulation, other first and second contacts on the closure insulation and adapted to engage said first and second partition insulation contacts, respectively, electrical conductors severally connecting each of said other first and second contacts with the first mentioned first and second contacts on the closure insulation, respectively, first and second binding posts on the case insulation, the first binding post being electrically connected with the first contact on the case insulation, the second binding post being electrically connected with the second contact on the partition insulation, and the second contact on the case insulation being electrically connected with the first contact on the partition insulation.

In testimony whereof I affix my signature.

FRANK R. STERK.